United States Patent [19]

Weissmueller et al.

[11] Patent Number: 4,459,476
[45] Date of Patent: Jul. 10, 1984

[54] CO-ORDINATE DETECTION SYSTEM

[75] Inventors: William W. Weissmueller, Wildwood; James Fitzgibbon, Lombard, both of Ill.

[73] Assignee: Zenith Radio Corporation, Glenview, Ill.

[21] Appl. No.: 340,604

[22] Filed: Jan. 19, 1982

[51] Int. Cl.³ .......................... G01V 9/04; G01J 1/20; G08C 9/00
[52] U.S. Cl. .................................... 250/221; 250/549; 340/365 P
[58] Field of Search ................ 250/221, 549; 313/474; 340/706, 365 P, 712

[56] References Cited

U.S. PATENT DOCUMENTS

| | | | |
|---|---|---|---|
| 3,764,813 | 10/1973 | Clement et al. | 250/221 |
| 3,860,754 | 1/1975 | Johnson et al. | 340/365 P |
| 4,313,109 | 1/1982 | Funk et al. | 250/221 |
| 4,346,376 | 8/1982 | Mallos | 250/549 |

Primary Examiner—David C. Nelms
Assistant Examiner—Ernest Austin, II

[57] ABSTRACT

The invention is directed to an X-Y co-ordinate detection system of the type which generates intersecting paths of radiation across a surface which may be, for example, a touch panel of the cathode ray tube type. Less expensive and more reliable operation is provided by developing the paths of radiation by use of radiation-emissive material disposed near at least one edge of the surface and excited by a flying spot of energy, such as an electron beam. In the preferred embodiment, strips of infrared emissive material are disposed on an internal surface of a cathode ray tube's panel and excited by overscanning the tube's electron beam to develop intersecting paths of infrared radiation across the tube's faceplate.

22 Claims, 12 Drawing Figures

CO-ORDINATE DETECTION SYSTEM

BACKGROUND OF THE INVENTION

This invention is directed generally to improvements in devices which generate X-Y co-ordinate information. Touch panels which respond to the interruption of intersecting light paths for developing data determinative of the X-Y position of the interruption are illustrative of the type of devices to which the invention is directed.

Conventional touch panels may include a CRT (Cathode Ray Tube) whose faceplate is surrounded by a plurality of discrete light emitting devices arranged to form intersecting light paths across the faceplate. Light sensors detect the interruption of a light path when a user touches a designated area of the CRT faceplate. In response to detecting such an interruption, the light sensors may output a signal to a controller for changing the display on the CRT faceplate. U.S. Pat. No. 4,247,767 exemplifies this type of display apparatus.

A significant problem associated with the conventional display device is the need for many discrete light emitting devices. In addition to their high cost and relatively poor resolution, the physical support for the light emitting devices and their wiring interconnects add additional expense. Furthermore, the usually uncertain reliability of the wiring interconnects renders such a display device impractical for many applications.

Accordingly, it is a general object of the invention to provide an improved X-Y co-ordinate detection system.

It is a more specific object of the invention to provide such a system which eliminates the need for a relatively large number of discreet light emitting devices.

It is another object of the invention to provide an improved system which utilizes a CRT faceplate for displaying graphics and one or more non-discrete emitters for developing X-Y co-ordinate interceptions on the CRT faceplate.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

The present invention is useful with a wide variety of systems which detect the interruption of intersecting paths of radiation, such as visible light or infrared radiation, to sense the X-Y co-ordinate of the interrupted paths. Such devices typically include a surface across which the intersecting paths of radiation cross. That surface may be a so-called "touch panel" which displays graphics or other images which a viewer may touch to input data to a controller. The image which is touched is identified by sensing the interruption of the radiation paths across the surface of the touch panel. Flat panel gas discharge surfaces and CRT faceplate surfaces are examples of this type of touch panel.

As stated previously, a conventional touch panel normally employs a large number of discrete light emitting devices to generate intersecting paths of light across its surface. The problems associated with such light emitting devices are avoided by the present invention by replacing the discrete light emitting devices with radiation-emissive material, preferably in one or more strips, which may be excited by a flying spot of energy such as an electron beam. The radiation thus provided develops intersecting paths of radiation which are directed across a surface which is to be touched. Interruption of paths of radiation by touching the surface is sensed conventionally, if desired, to detect the X-Y co-ordinate at which the interruption occurs.

Figure 1:
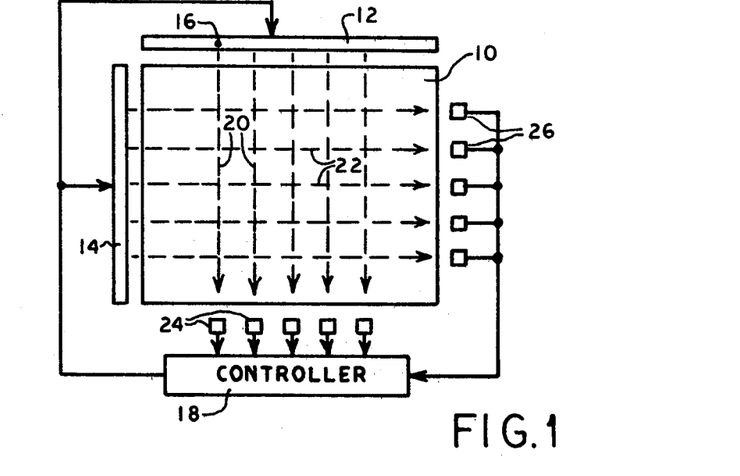
FIG. 1 is a schematic representation of an X-Y co-ordinate detection system showing, in a general manner, several aspects of the invention.

Some of the broader aspects of the invention are now described more specifically with reference to FIG. 1. In this figure, the reference numeral 10 designates a surface across which intersecting paths of radiation are established. The surface 10 may, but need not be, a light emissive surface such as a touch panel formed by the faceplate of a CRT or another type of image generating device.

Instead of using discrete light emitting devices to provide the required radiation, the present invention employs at least one strip of material which emits radiation when excited. For purposes of explanation, however, two strips 12, 14 of radiation-emissive material are shown. These strips may, however, be joined together to form one continuous strip of radiation-emissive material.

The strips 12 and 14 may be formed, for example, by deposits of light emissive phosphors of the type used in CRTs in the case where the radiation is to be in the visible light spectrum. Where it is desired to develop invisible paths of radiation, the strips 12 and 14 preferably include material which emits infrared radiation when excited.

To excite the strips 12 and 14 into emission, it is preferred to scan the strips with a travelling spot of energy. Such a spot of energy, indicated by the reference numeral 16, may be developed by an electron beam or by the operation of a conventional gas plasma device, of which the strips 12 and 14 may be a part. For purposes of the present explanation, the manner in which the spot 16 is developed is not shown in FIG. 1. In the description below, however, electron beam scanning is described in detail.

In the preferred application, the moving spot of energy is caused to scan and excite the strips 12 and 14 under the control of a controller 18. This controller may include, for example, a microprocessor or computer which is programmed to move the spot 16 across the strip 12 so as to generate paths of radiation 20 which extend vertically across the surface 10. Likewise, the controller 18 causes the spot 16 to scan and excite the strip 14 for generating paths of radiation 22 which extend horizontally across the surface 10. The intersections of the radiation paths 20 and 22 define X-Y co-ordinates on or immediately above the surface 10.

Although the controller 18 is shown as being connected directly to the strips 12 and 14, no such direct connection is necessarily made in some applications. Such a connection is intended, however, to indicate functionally the control which the controller exerts over the position of the spot 16.

To sense an interruption in the paths of radiation, as when a user touches the surface 10 at an X-Y co-ordinate, any suitable type of sensor may be used. For illustrative purposes, each of the paths 20 is shown as impinging on its own light sensor 24, and each of the paths 22 is shown as impinging on its own light sensor 26. The outputs of the sensors 24, 26 are input to the controller 18 which may scan the sensor outputs sequentially in synchronism with the generation of the radiation paths to detect the X-Y location at which the interruption occurred.

As described in more detail below, the surface 10 is preferably a touch panel which is excited to display images, and the strips 12 and 14 are excited by the same mechanism which excites the surface 10. For example, where the surface 10 is the faceplate of a CRT which is excited by its internally generated electron beam, the same beam is used to excite the strips 12 and 14 under computer control.

The present invention also contemplates that the strips 12 and 14 be scanned by a substantially, continuously moving beam, preferably to excite a plurality of selected areas on the strips to develop a corresponding plurality of radiation paths. These objectives are economically met by depositing the strips 12 and 14 (or one continuous strip) inside the glass envelope of a CRT such that the strip or strips are disposed along adjacent edges of the faceplate. The strips are preferably excited by causing the CRT's electron beam to overscan the faceplate and thereby impinge on and excite the strips. Thus, the radiation-emissive strips are excited in a raster scan mode, assuming that the CRT is operated in that mode. In the case where the CRT operates in a so-called "stroke-write" mode, the strips will also be excited in the stroke-write mode.

Figure 2:
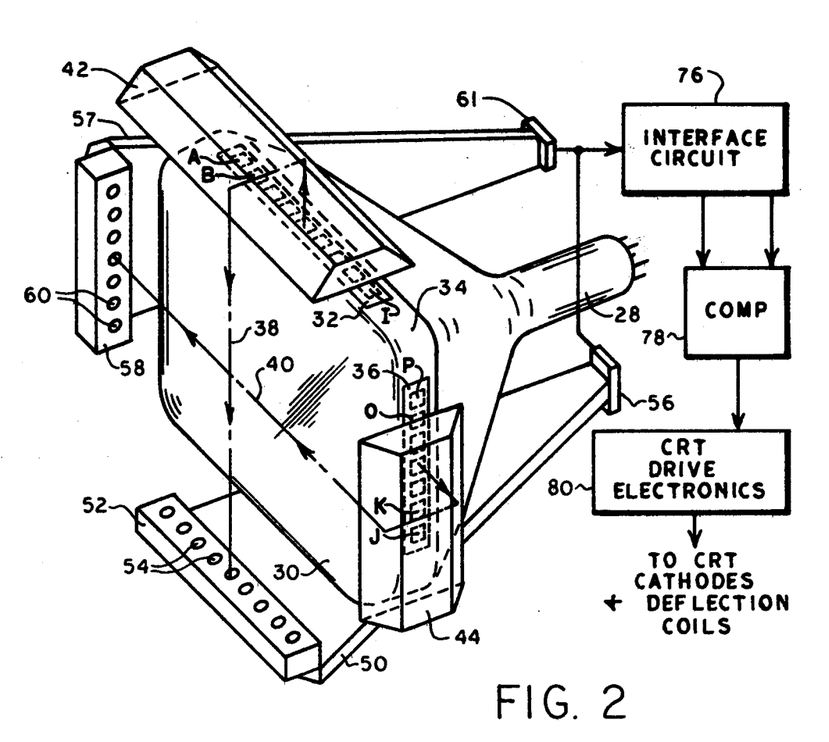
FIG. 2 illustrates a preferred embodiment of an X-Y co-ordinate detection system utilizing a cathode ray tube.

Referring now to FIG. 2, an X-Y co-ordinate detection system is shown which incorporates the principles described above. This system includes a CRT 28 whose faceplate 30 serves as a touch panel. Images may be generated on the tube's faceplate in the conventional manner by the tube's electron beam to indicate which areas of the faceplate a user may touch to command that different or additional images be displayed. Other effects may also occur when the faceplate is touched, but such effects are not pertinent to the invention.

Preferably, the CRT 28 is raster scanned for moving its electron beam horizontally and vertically to excite various phosphor coated areas on the faceplate. Such scanning may be effected at any convenient rate, such as that defined by NTSC or other standards.

In order to provide intersecting paths of radiation across the faceplate 30, a strip 32 of radiation-emissive material is deposited inside the tube's glass envelope adjacent one edge (the top edge, for example) of the faceplate 30. Preferably, the strip 32 is deposited on the interior surface of the tube's panel 34 near the point where the panel blends with or meets the faceplate.

Another strip 36 of radiation-emissive material is deposited on the panel adjacent another edge of the faceplate. This latter strip is also inside the tube's envelope and on its panel.

The preference for placing the strips on the tube's panel arises from the fact that the strips 32 and 36 may be, and preferably are, excited by causing the tube's electron beam to overscan the active scan area on the faceplate 30. Such overscan may be achieved by increasing the energy in the conventional deflection signals which are applied to the tube's deflection windings (not shown). Usually, a CRT of this character will have an adjustable picture size control. That control may be adjusted in the direction of increasing picture size to cause the tube's electron beam to overscan onto the strips 32 and 36. If desired, the picture center may be offset slightly toward the strips 32 and 36 so that overscan occurs only at the faceplate edges adjacent the strips 32 and 36.

As described in more detail below, the strips 32 and 36 may be scanned by the electron beam such that individual areas A, B through I on the strip 32 are excited to develop individual paths or beams of radiation which are directed downwardly across the faceplate 30. Likewise, individual areas J, K through P on the strip 36 may be excited to develop individual paths or beams of radiation which are directed horizontally across the faceplate. The arrows 38 and 40 represent two such radiation beams generated by excited areas on the strips 32 and 36. In practice, nine such areas may be excited on the strip 32 and seven such areas may be excited on the strip 36. Because of the nature of the excitation, however, more excitation areas may readily be employed to provide a higher resolution system.

Figure 3:
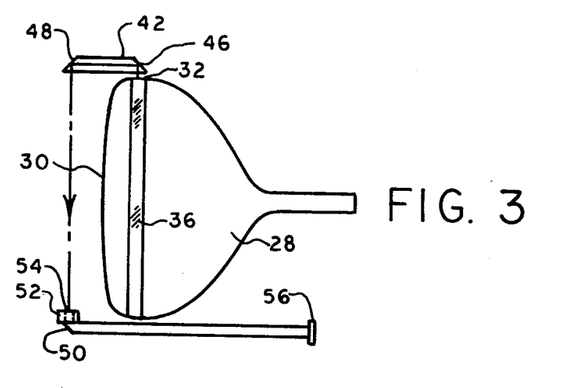
FIG. 3 is a simplified side view of the cathode ray tube which more clearly illustrates how emitted radiation is directed across the faceplate of the tube.

Because the strips 32 and 36 are disposed on the tube's panel in this embodiment, the radiation emitted by these strips is directed upwardly by the excited areas on the strip 32 and horizontally outward of the tube by the excited areas on the strip 36. To redirect these emissions across the tube's faceplate, prisms or reflectors 42 and 44 are included. The reflector 42 is situated above or on the top of the CRT and aligned with the strip 32 so as to reflect the emitted radiation downwardly. As shown more clearly in FIG. 3, the reflector 42 includes reflecting surfaces 46 and 48 for receiving radiation from the strip 32 and for directing it downwardly across the faceplate 30. The reflector 44 (omitted from FIG. 3 for clarity) is similarly constructed and arranged to direct radiation from the strip 36 horizontally across the faceplate 30.

To sense the radiation paths or beams, a plastic plate 50 is disposed beneath a member 52 which includes vertically oriented apertures 54. Each of the apertures in the member 52 is aligned with an excited area of the strip 32 for passing a beam of radiation to the plate 50. The plate 50 may be a flat piece of plexiglass having a triangular shape, the apex of which abuts a radiation sensor 56. The radiation collected by the plate 50 is directed rearwardly to the apex for impinging on the sensor 50. U.S. application Ser. No. 264,725, filed May 18, 1981, describes the construction and operation of the plate 50 in more detail. The teachings of that application are included herein by reference.

Detection of the radiation from excited areas on the strip 36 is achieved in a similar manner. Another plastic plate 57 is mounted beside a member 58 which includes apertures 60. Each of the apertures in the member 58 is aligned with an excited area of the strip 36 for passing a beam of radiation to the plate 57. The plate 57, also flat and triangular in shape, receives the beams from the apertures 60 and directs them rearwardly of the CRT to the plate's apex where the collected radiation impinges on another radiation sensor 61. The construction of the plate 57 may be as described in the previously referenced patent application.

The outputs of the sensors 56 and 61 are coupled to an interface circuit 76 which amplifies and conditions the signals from the sensors and applies the conditioned signals to a computer 78.

The computer 78 basically serves two functions: to interpret the sensor data received from the interface circuit and to generate video and deflection signals for application to CRT drive electronics 80. The video signals generated by the computer 78 include conventional graphics to be displayed on the faceplate of the CRT and signals for exciting the strips 32 and 36. The drive electronics 80 essentially amplifies the video signals and applies them to the cathode (or other control electrode) of the CRT. The deflection signals (horizontal and vertical sync) generated by the computer 78 are amplified and applied by the drive electronics to the CRT's deflection coils.

There are several methods of scanning the strips under the control of the computer 78. These methods are described in more detail below. Suffice it to say at this juncture that the computer 78 may generate video signals which sequentially excite the areas A, B through I on the strip 32, and then sequentially excite the areas J, K through P on the strip 36. Because the computer "knows" when the various strip areas are excited, it knows when to expect signals from the sensors 56 and 57 via the interface circuit 76. Accordingly, the absence of a timely sensor signal from the interface circuit can be interpreted by the computer as an interruption of known light paths. Hence, the X-Y co-ordinate of the interruption is also known.

Figure 4:
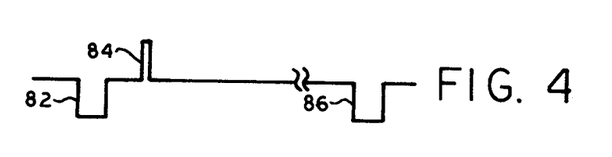
FIG. 4 depicts an illustrative video signal for exciting one area of a radiation-emissive strip carried by the cathode ray tube of FIG. 2.

In the case where the CRT generates a raster scan, the following method may be employed to scan the strips 32 and 36. Assuming that the CRT overscans the faceplate vertically by eight horizontal scan lines, the first such scan line may correspond to the video signal shown in FIG. 4. This signal may begin with a horizontal sync pulse 82 followed by a video pulse 84 whose duration may be about two microseconds. Another horizontal sync pulse 86 signifies the beginning of the next scan line. The pulse 84 modulates the CRT's electron beam in order to excite a first portion of the strip area A.

Figure 5:
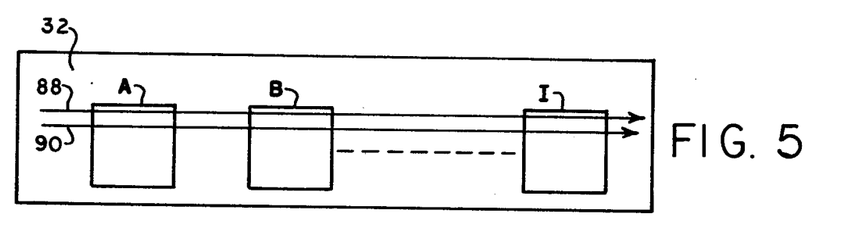
FIG. 5 is a top view of one of the radiation-emissive strips shown in FIG. 2 for use in explaining how the strip may be excited.

Referring to FIG. 5, an expanded view of the strip 32 is shown along with areas A through I which are to be excited. The illustrated scan line 88 crosses the area A in coincidence with the occurrence of the pulse 84, thereby exciting the portion of area A underlying the first scan line 88. The other areas of the strip 32 are not excited by this first scan line.

The second scan line 90 is modulated identically to the first scan 88. That is, a pulse 84 in the next line of video excites another portion of the area A which is struck by electron beam associated with scan line 90.

Six more scan lines, all modulated identically to the first scan line 88, excite the remainder of area A. Thereafter, the next scan line may include video signals to develop graphics, if any, on the faceplate in addition to a video pulse for exciting the top portion of area P (FIG. 2) in the strip 36. The remaining scan lines in this first field include video pulses which excite the remainder of area P as well as areas J-O.

At the beginning of the second field, the first scan line thereof modulates the electron beam by a video pulse positioned to excite only a portion of area B in strip 32. The next seven scan lines include similar video pulses to complete the excitation of area B. Thereafter, scanning continues as described above for once again generating graphic images on the CRT's faceplate and sequentially exciting areas J-P (in reverse order). Areas C through I are excited in a similar manner during seven successive scan fields. Thus, only one area of the strip 32 is fully excited in one scan field, but all areas J-P on the strip 36 are fully excited during each scan field.

Figure 6:
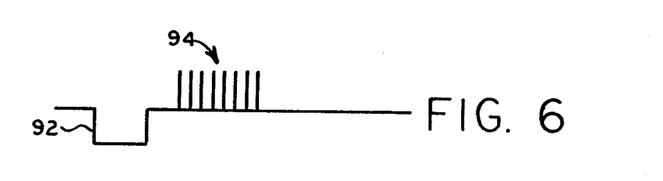
FIG. 6 is a waveform illustrating the field rate output of one excited area on the radiation-emissive strip shown in FIG. 2.

Referring to FIG. 6, the field rate signals developed by a sensor are shown in relationship to a vertical sync pulse 92. As shown, eight pulses 94 are developed in response to scanning a particular area of a strip. For the excited areas on the strip 32, only one such area causes pulses 94 to be developed in a given field because only one area of the strip 32 is fully excited per field. However, the excited areas on the strip 36 will each cause eight such pulses 94 to be developed in each field. These pulses 94 may be integrated conventionally for detecting the output of each excited area. Of course, any other convenient number of scan lines may be used to excite an area on either strip.

Figure 7:
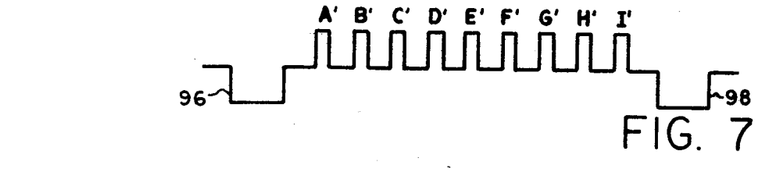
FIG. 7 shows a video waveform for exciting a radiation-emissive strip by another technique.

Another method of exciting the area of strips 32 can be seen from FIG. 7. This figure shows one of the eight video lines which overscan to excite the strip 32. Each such line includes video pulses A'-I' following a horizontal sync pulse 96 and preceding another horizontal sync pulse 98. The latter sync pulse signifies the beginning of the next scan line.

The pulses A' through I' individually excite a portion of each area A-I. Thus, about one-eighth of each area in the strip 32 is excited in one horizontal line interval. Seven more successive video lines all identical to the line shown in FIG. 7, complete the excitation of area A-I in the strip 32. Thereafter, the areas J-P in strip 36 are excited in the manner previously described. Thus, this alternate method of scanning fully excites each area of the strips 32 and 36 in each scan field.

Figure 8:
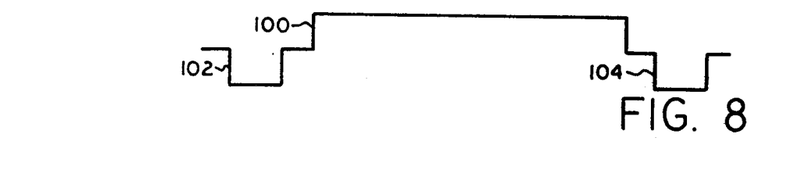
FIG. 8 shows a video waveform for exciting a radiation-emissive strip by yet another technique.

A third method for scanning the strip 32 excites not individual area A-I, but the entire strip 32 to create a continuous sheet of radiation extending across the faceplate. This scan method may be accomplished by beginning a scan field with eight consecutive video lines of the character depicted in FIG. 8. As shown, a relatively wide video pulse 100 is disposed between horizontal sync pulses 102 and 104. The width of the pulse 100 is selected to cause excitation of all nine areas A-I on the strip 32, including portions of the strip 32 between adjacent areas. Seven more successive video lines, identical to the line shown in FIG. 8, excite the remaining portions of the strip 32. The strip 36 may be scanned as described previously.

When the latter method of scanning is utilized, the plate 50 (FIG. 2) may be replaced by nine individual sensors, each located beneath one of the apertures 54 in the member 52. Moreover, the plates 50 and 57 may be replaced by individual sensors when any of the scanning methods described herein are employed. Where practical, however, it is preferred to use the plates 50 and 57 to reduce the number of sensors.

In the preferred embodiment, the strips 32 and 36 are selected to emit infrared radiation so that the resulting radiation paths will be invisible. In that case, the sensors should, of course, be sensitive to infrared radiation. Strips which emit radiation in the visible spectrum may be used in applications where that radiation does not interfere with the visibility of images generated on the faceplate of the CRT.

Figure 9:
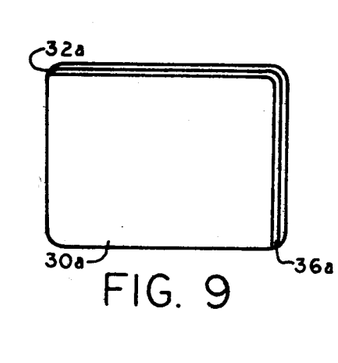
FIG. 9 illustrates an alternate disposition of radiation-emissive strips wherein the strips are disposed on the faceplate of a cathode ray tube.

In the usual case, it is preferred to deposit the radiation emissive strips on the panel of the CRT. The CRT's faceplate is then left free to display a full raster of graphics. Alternately, the strips may be deposited on the faceplate itself. This alternative is illustrated in FIG. 9 in which a CRT faceplate 30a carries, on its internal surface, strips 32a and 36a of radiation-emissive material preferably, infrared emissive material. These strips may be joined together as shown to form one continuous strip, or deposited separately to form two individual strips.

Figure 10:
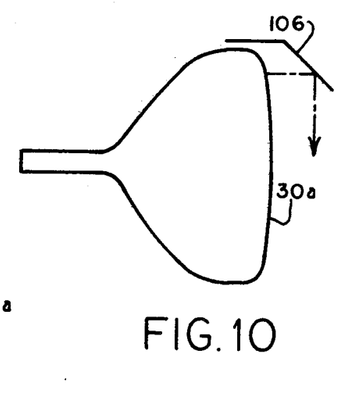
FIG. 10 is a side view of the tube shown in FIG. 9, including a reflector for directing emitted radiation across the tube's faceplate.

With the strips disposed as shown in FIG. 9, their emission is directed outwardly through the faceplate (toward the viewer). The emission from strip 32a may be deflected downwardly across the surface of the faceplate 30a as shown in FIG. 10. Here, a reflector 106 redirects the emission from strip 32a downwardly. A similar reflector may be included to redirect the emission from strip 36a across the surface of the faceplate 30a.

The strips 32 and 36 may be deposited on the panel of the CRT 28 using conventional techniques. For example, the following steps may be employed:

Step 1. Starting with a plain clean bulb, insert a sensitized PVA (polyvinyl alcohol) slurry through the neck of the bulb. The slurry may include PVA, water, a wetting agent, methnol, plus an infrared emitting phosphor such as copper-activated zinc cadmium sulfide.

Step 2. With the bulb in a horizontal position, allow the slurry to settle on one side of the bulb's panel for about fifteen minutes.

Step 3. Remove the excess slurry through the bulb's neck using a flow of nitrogen.

Step 4. Repeat steps 1, 2 and 3 for another side of the bulb's panel to provide a second strip.

Step 5. Mask the slurry areas which extend beyond the desired boundaries of the strips and flood expose the deposited slurry with ultraviolet light for about one minute on each side.

Step 6. Flush the inside of the bulb with water to remove unexposed slurry.

Step 7. Screen the faceplate of the bulb using conventional techniques, but avoid the use of any acid which might dissolve the strips.

Referring again to FIG. 2, and particularly to the interface circuit 76, the computer 78 and the drive electronics 80, these components may be conventional. By way of example, the interface circuit 76 may be of the type shown in FIG. 11 and the computer 78 may be of the type shown in FIG. 12.

Figure 11:
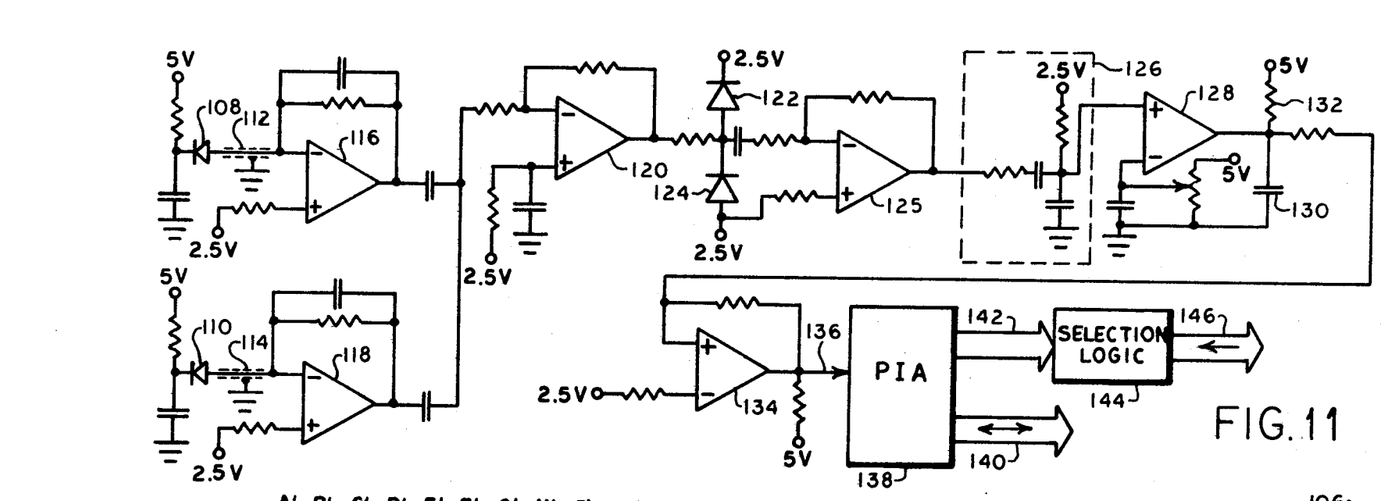
FIG. 11 is an exemplary circuit diagram of the interface circuit shown in FIG. 2.

Referring first to FIG. 11, the sensors 56 and 61 are shown as photo detectors 108 and 110. The outputs of these detectors are coupled through shielded cables 112 and 114 to amplifiers 116 and 118. These amplifiers act essentially as current to voltage converters.

The outputs of amplifiers 116 and 118 are both coupled to a linear amplifier 120, the output of which is coupled to a clipper comprising diodes 122 and 124. The clipper causes all its received signals to be clipped to the same maximum amplitude.

Another linear amplifier 125 receives signals from the clipper, amplifies them, and applies them to a filter 126. The output from this filter is coupled to the non-inverting input of a comparator 128. The inverting input of comparator 128 receives a reference voltage which is compared to the signal received from the filter 126. If the signal from filter 126 is sufficiently large, the output of comparator 128 goes low to discharge a capacitor 130. When the low output terminates, the capacitor 130 charges toward the supply voltage coupled to resistor 132. The output of comparator 128 is thus stretched and then applied to a Schmitt trigger 134. The latter device operates to develop a well defined pulse output on lead 136.

Pulses on lead 136 are coupled to a conventional PIA 138 (peripheral interface adapter). A bi-directional data buss 140 couples the PIA to the computer 78. Another buss 142 couples the PIA to conventional selection logic 144 which is, in turn, coupled to the computer 78 via an address buss 146.

Figure 12:
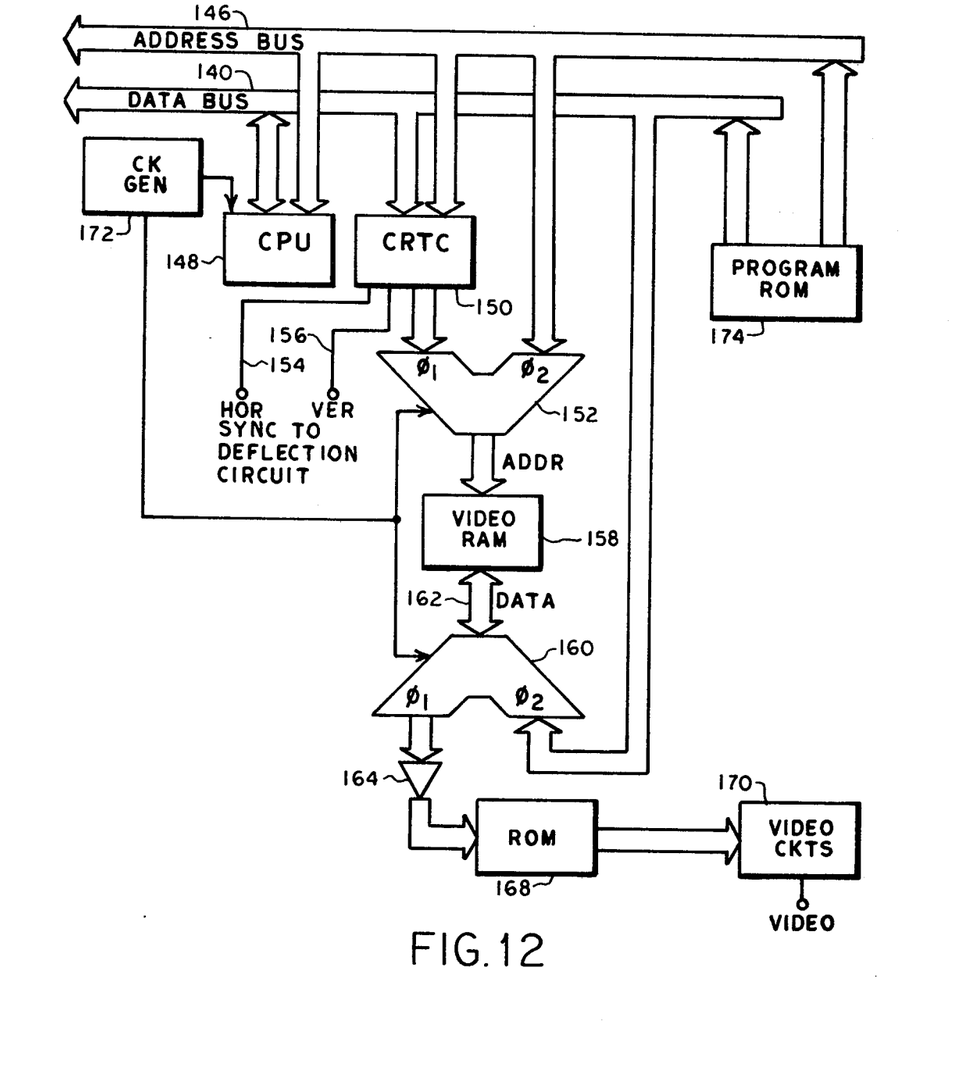
FIG. 12 illustrates exemplary architecture of the computer shown in FIG. 2.

Turning now to FIG. 12, the computer 78 is shown as including a CPU 148 coupled to the data buss 140 (the buss 140 connects to the PIA in FIG. 11) and to the address buss 146 (the buss 146 connects to the selection logic 144 in FIG. 11). A CRTC (Cathode Ray Tube Controller) 150 is also coupled to the data and address busses, as well as to a conventional multiplexer 152. The outputs developed by the CRTC 150 include horizontal sync pulses on lead 154 and vertical sync pulses on lead 156. These pulses are coupled to the CRT drive electronics 80 (FIG. 2) for further amplication.

The multiplexer 152 is coupled to the address buss 146 and to a video RAM (Random Access Memory) 158 for supplying address information thereto. Data is coupled between the RAM 158 and another multiplexer 160 via a data buss 162.

An output from the multiplexer 160 is coupled to an amplifier 164 which drives a character ROM 168. The data output from the ROM 168 is coupled to conventional video circuits 170 which supply video information to the CRT drive electronics 80.

The remaining components of the computer include a clock generator 172 and a program ROM 174. The clock generator serves to synchronize the CPU 148 with the multiplexers 152 and 160. The program ROM 174 is programmed in a manner well known to those skilled in the art for instructing the CPU 148 as to what type of graphics, if any, are to be displayed on the CRT's faceplate, and as to how the infrared strips are to be excited.

All the individual components shown in FIG. 12 are conventional. For example, the CPU 148 may be a Motorola 6800, and the CRTC 150 may be a Motorola 6845. The functions of these and the other illustrated components are well known to those skilled in the art. Suffice it to say that the signals received from the sensors are interpreted to detect the X-Y co-ordinate where an interruption of radiation paths occurs; raster scan of the CRT is synchronized by the horizontal and vertical sync pulses generated by the CRTC; and the graphics displayed on the CRT's faceplate, as well as the excitation pulses for strips 32 and 36 (or 32a and 36a) are included in the output of video circuits 170.

From the foregoing description, it will be apparent to those skilled in the art that a less expensive and more reliable co-ordinate detection system is provided by replacing the conventional arrays of discreet light emitting devices with the above-described radiation emissive material and by exciting that material by a flying spot of energy. Cost advantages are especially evident in the embodiment therein strips of radiation emissive material are deposited on the internal glass surface of a cathode ray tube. In this case, no extra exciter is required for the radiation emissive material because it responds to the same electron beam used to develop images on the faceplate.

Although the invention has been described previously in terms of a preferred embodiment and preferred scanning techniques, it will be obvious to those skilled in the art that many alterations and modifications may be made without departing from the invention. Accordingly, it is intended that all such modifications and alterations be considered as within the spirit and scope of the invention as defined by the appended claims.

What is claimed is:

1. In an X-Y co-ordinate detection system having a display surface for providing a visual display image when excited and across which to develop X-Y co-ordinates, and having means for providing intersecting paths of radiation across the display surface, the improvement comprising:
    means including radiation-emissive material located near at least one edge of the display surface for developing, when excited, paths of radiation across said surface; and
    means for developing a flying spot of energy for exciting both the display surface for providing the visual display image and the radiation-emissive material for providing the intersecting paths of radiation across the display surface.

2. A system as set forth in claim 1 wherein said spot of energy excites the display surface and the radiation-emissive material in a raster scan mode.

3. An X-Y co-ordinate detection system, comprising:
    a display surface for providing a visual display image when excited and across which to develop X-Y co-ordinates;
    means including at least one strip of radiation emissive material disposed about adjacent edges of the display surface for developing, when excited, intersecting paths of radiation across said surface, such intersections defining X-Y co-ordinates;
    means for developing a flying spot of energy for exciting both said display surface for providing the visual display image and said strip for providing the intersecting paths of radiation across the surface; and
    means for sensing the interruption of the paths to detect the X-Y co-ordinate at which the interruption occurs.

4. A system as set forth in claim 3 wherein said exciting means includes a substantially constantly moving electron beam.

5. A system as set forth in claim 4 wherein said surface is the faceplate of a cathode ray tube, and wherein said electron beam is generated by the cathode ray tube.

6. A system as set forth in claim 1 wherein said exciting means is adapted to excite a plurality of selected areas of said strip to develop a corresponding plurality of radiation paths.

7. A system as set forth in claim 3 wherein said surface is the faceplate of a cathode ray tube, and wherein said exciting means includes an electron beam.

8. A system as set forth in claim 7 wherein the strip is located inside the cathode ray tube and the electron beam is overscanned for exciting the strip.

9. A system as set forth in claim 7 wherein the radiation-emissive strip is disposed on an internal surface of the cathode ray tube's faceplate.

10. A system as set forth in claim 7 wherein said strip emits infrared radiation.

11. A system as set forth in claim 9 wherein the cathode ray tube includes a panel whose internal surface carries said strip.

12. A system as set forth in claim 7 wherein a plurality of selected areas on said strip are excited sequentially by the electron beam to provide a corresponding plurality of radiation paths.

13. A system as set forth in claim 12 including a first strip of radiation-emissive material for emitting paths of radiation in a first direction across the faceplate of the cathode ray tube, and a second strip of radiation-emissive material for emitting paths of radiation in a second direction across the faceplate of the cathode ray tube, and wherein the electron beam is controlled to substantially fully excite one of a plurality of different selected areas on the first strip per scan field and to fully excite a plurality of different areas on the second strip during each scan field.

14. A system as set forth in claim 13 wherein the excited areas on the first strip are substantially fully encompassed within N overscanned scan lines, wherein one such area on the first strip is substantially fully excited by N successive scan lines in a given field, and wherein an adjacent area on the first strip is substantially fully excited by N scan lines in the next successive field.

15. A system as set forth in claim 14 wherein a plurality of excitable areas on the second strip are each excited by the electron beam by a plurality of successive scan lines in each scan field.

16. A system as set forth in claim 12 wherein the electron beam is controlled to excite a fraction of each of said selected areas in a single line scan, and to fully excite said areas in multiple successive line scans in the same scan field.

17. A system as set forth in claim 16 wherein said strip of radiation-emissive material is positioned to develop vertically oriented paths of radiation across the faceplate of the cathode ray tube, and including a second strip of radiation emissive material for developing horizontally oriented paths of radiation across the faceplate of the cathode ray tube.

18. A system as set forth in claim 17 wherein the electron beam is controlled to substantially fully excite a plurality of areas on said second strip during each scan field.

19. A system as set forth in claim 7 wherein the electron beam is controlled to substantially fully excite said strip during a single scan field.

20. A system as set forth in claim 19 wherein the electron beam is controlled to scan substantially the entire strip in a single scan line, and to rescan substantially the entire strip in successive scan lines within the same scan field.

21. An X-Y co-ordinate detection system, comprising:

a cathode ray tube having a light emissive faceplate, a panel surrounding the faceplate, and an electron beam emitter for raster scanning the faceplate and for overscanning the faceplate onto the panel;

first and second strips of infrared emissive material deposited on adjacent internal surfaces of the tube's panel;

computer means for causing the electron beam to excite selected areas of the strips such that the strips emit infrared radiation;

means for directing the infrared radiation across the tube's faceplate to form intersecting paths of infrared radiation at X-Y co-ordinates; and means for sensing the interruption of the intersecting paths for detecting the X-Y co-ordinate at which the interruption occurs.

22. A system as set forth in claim 21 wherein said first strip is disposed to develop vertically oriented radiation paths and said second strip is disposed to develop horizontally oriented radiation paths, and wherein the selected areas of the first strip are excited sequentially on a field-by-field basis, and the selected areas on the second strip are substantially fully excited sequentially by successive lines scans of the electron beam.

* * * * *